(12) United States Patent
Baba

(10) Patent No.: US 7,354,245 B2
(45) Date of Patent: Apr. 8, 2008

(54) WIND POWER GENERATION DEVICE

(75) Inventor: Yoshimi Baba, Yokohama (JP)

(73) Assignee: Baba Technical Laboratory Inc., Tokyo (JP)

( * ) Notice: Subject to any disclaimer, the term of this patent is extended or adjusted under 35 U.S.C. 154(b) by 0 days.

(21) Appl. No.: 10/540,849

(22) PCT Filed: Dec. 27, 2002

(86) PCT No.: PCT/JP02/13785

§ 371 (c)(1),
(2), (4) Date: Jun. 27, 2005

(87) PCT Pub. No.: WO2004/061297

PCT Pub. Date: Jul. 22, 2004

(65) Prior Publication Data

US 2006/0088413 A1 Apr. 27, 2006

(51) Int. Cl.
*F03D 7/02* (2006.01)
(52) U.S. Cl. .................... 415/908; 415/4.3
(58) Field of Classification Search ............ 415/222, 415/4.1, 4.3, 4.5, 908; 290/55
See application file for complete search history.

(56) References Cited

U.S. PATENT DOCUMENTS 3,339,078 A    8/1967   Crompton
4,075,500 A *  2/1978   Oman et al. ............ 290/55
4,140,433 A    2/1979   Eckel

FOREIGN PATENT DOCUMENTS

| EP | 0 045 202 | 2/1982 |
| EP | 0 045 264 | 2/1982 |
| FR | 975 625 | 3/1951 |
| JP | 56-74871 | 6/1981 |
| JP | 2003-28043 | 1/2003 |

* cited by examiner

Primary Examiner—Edward K. Look
Assistant Examiner—Dwayne J White
(74) Attorney, Agent, or Firm—Paul A. Guss

(57) ABSTRACT

A wind power generation device capable of improving power generation efficiency is provided. The wind power generation device according to the present invention comprises: a substantially cylindrical duct 1 having a side wall with a substantially wing section; an impeller 2 rotatable around an axis of the duct 1; and a nacelle 5 that constitutes a streamlined pencil body 3 together with the impeller 2 and houses a generator 4 that uses torque of the impeller 2. The duct 1 has the side wall with the wing section so as to be able to produce a reduced pressure area at a rear of the duct and prevent generation of swirl at the rear of the duct 1. The pencil body 3 is provided so that a tip thereof is placed in the duct 1 and a rear end thereof protrudes from a rear end of the duct 1 so as to be close to a tip of the reduced pressure area produced at the rear of the duct 1. Blades 21 of the impeller 2 are provided in a maximum wind speed area 13 in the duct 1.

5 Claims, 4 Drawing Sheets

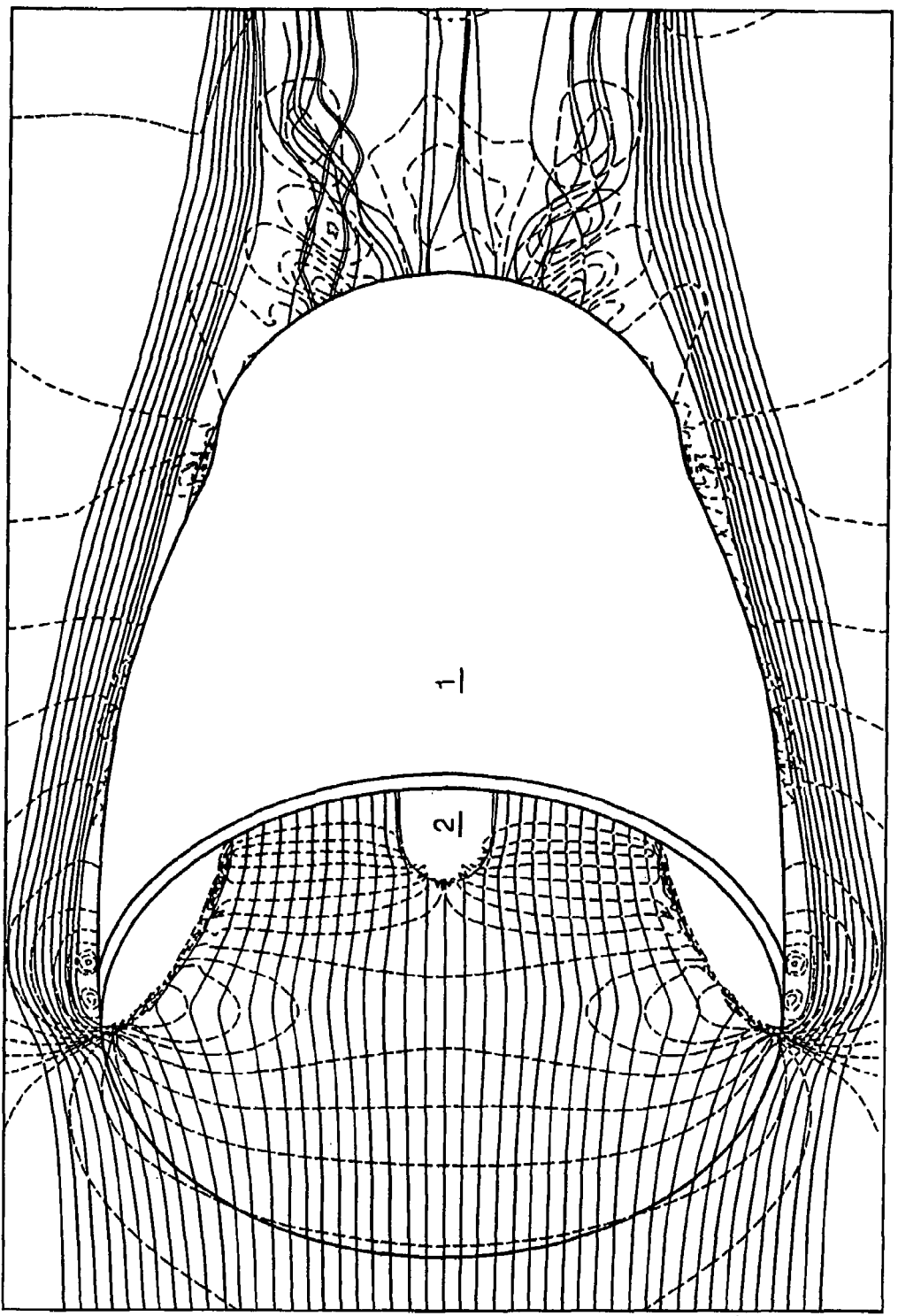

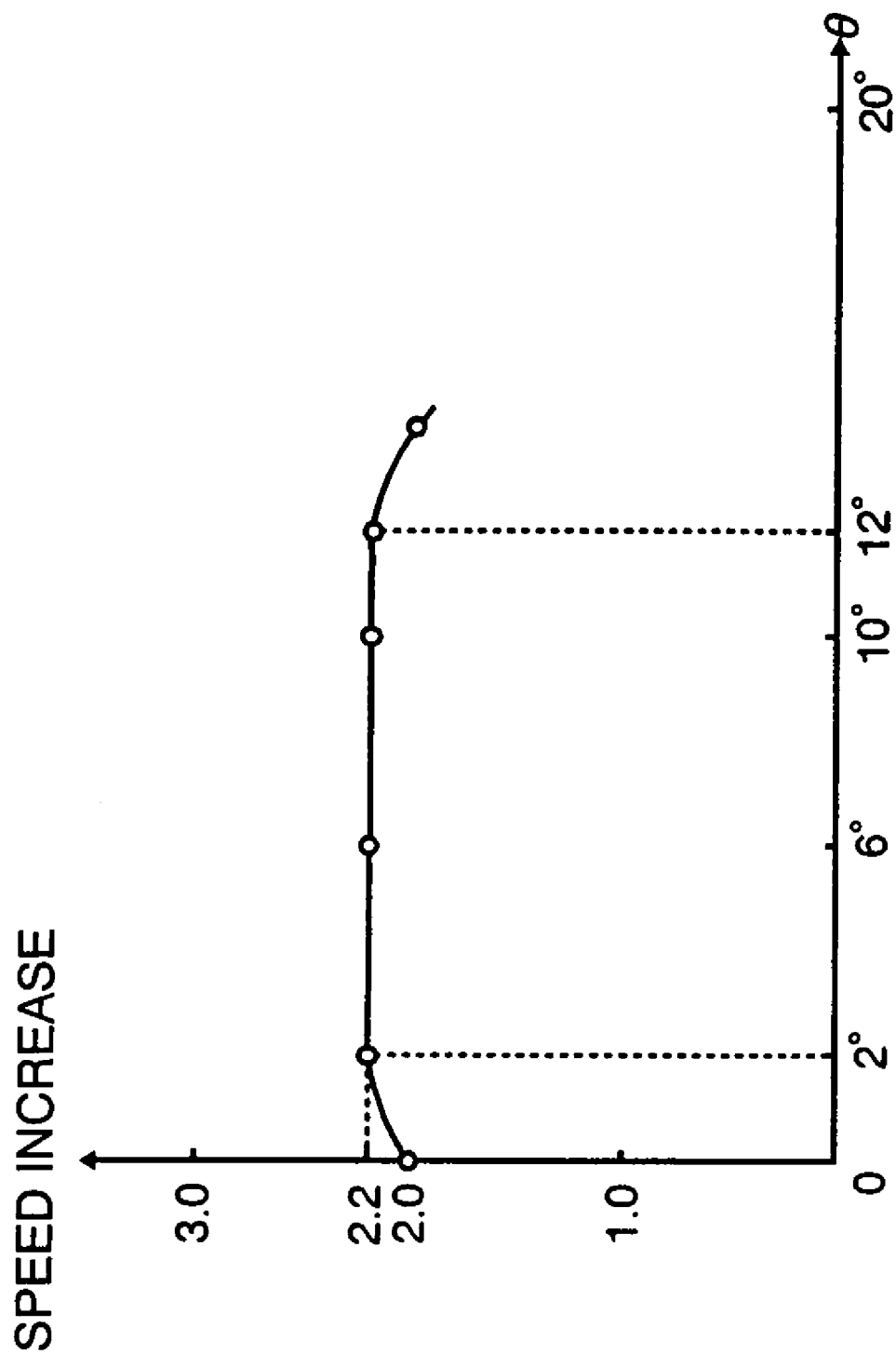

WIND POWER GENERATION DEVICE

TECHNICAL FIELD

The present invention relates to a wind power generation device comprising: a substantially cylindrical duct having a side wall with a substantially wing section; an impeller having a plurality of blades protruding outward and rotatable around a duct axis; and a nacelle that constitutes a streamlined pencil body together with the impeller and houses a generator that uses torque of the impeller.

BACKGROUND ART

Some wind power generation devices similar to the above described wind power generation device have been proposed in view of efficient rotation of an impeller for improving power generation efficiency (see Japanese Utility Model Laid-Open No. 56-74871).

The inventor of the present application has studied airflow near a wind power generation device and found that power generation efficiency is susceptible to improvement.

Thus, the present invention has an object to provide a wind power generation device capable of improving power generation efficiency.

DISCLOSURE OF THE INVENTION

In order to achieve the above described object, a wind power generation device according to the present invention is characterized in that a duct has a side wall with a wing section so as to be able to produce a reduced pressure area at a rear of the duct and prevent generation of swirl at the rear of the duct, a pencil body is provided so that a tip thereof is placed in the duct and a rear end thereof protrudes from a rear end of the duct so as to be close to a tip of the reduced pressure area produced at the rear of the duct, and blades of an impeller are provided in a maximum wind speed area in the duct.

According to the invention, when wind from the front to the rear of the duct is created, the reduced pressure area can be produced while generation of swirl is prevented at the rear of the duct. Thus, bringing wind into the duct by the reduced pressure area can increase the wind speed in the duct while eliminating the flow of wind from the front to the inside of the duct being prevented by the swirl at the rear of the duct.

On the other hand, according to the inventor's findings, the tip of the reduced pressure area is tapered and unstable and is apt to sway in a diametrical direction of the duct, and thus large sway resulting from changes in directions of wind near the tip causes the entire reduce pressure area to disappear. This prevents the increase in the wind speed in the duct and thus improvement in power generation efficiency.

Thus, as in the present invention, the rear end of the pencil body protrude from the rear of the duct so as to be close to the tip of the reduced pressure area, thereby bringing the tip of the reduced pressure area to the rear end of the pencil body to prevent the sway. This prevents the sway of the tip of the reduced pressure area causing the entire reduced pressure area to disappear while the wind blows from the front to the rear of the duct. Then, the reduced pressure area at the rear of the duct can be maintained in a steady state to ensure the increase in the wind speed in the duct.

The blades of the impeller are provided in the maximum wind speed area in the duct, thereby allowing the impeller to be rotated to the maximum extent.

Therefore, according to the wind power generation device of the present invention, power generation efficiency can be improved through: (1) the increase in the wind speed in the duct resulting from the production of the reduced pressure area at the rear of the duct; (2) maintaining the steady state of the reduced pressure area by preventing the sway of the tip of the reduced pressure area; and (3) the rotation of the impeller in the maximum wind speed area in the duct.

Further, the wind power generation device according to the present invention is characterized in that a chord of the wing section of the side wall of the duct is inclined at a predetermined angle to the duct axis, and a protruding length of the rear end of the pencil body from the rear of the duct is adjusted according to a position of the tip of the reduced pressure area that changes depending on the predetermined angle.

The present invention is based on the following inventor's findings.

Specifically, the chord of the wing section of the side wall of the duct is inclined to the duct axis to change the degree of reduced pressure in the reduced pressure area at the rear of the duct. Therefore, the inclination is adjusted so as to provide a maximum degree of reduced pressure in the reduced pressure area, and thus the wind flowing from the front to the inside of the duct is further strongly brought into the duct by the reduced pressure area at the rear of the duct, thereby further increasing the wind speed in the duct.

With the increase in the inclination, the tip of the reduced pressure area produced at the rear of the duct moves to a more forward position. Thus, a protruding length from the duct is adjusted according to the inclination so that the rear end of the pencil body reaches the tip of the reduced pressure area, thereby preventing the sway of the tip of the reduced pressure area.

Therefore, according to the wind power generation device of the present invention, in addition to the above described items (1) to (3), power generation efficiency can be maximized through: (4) maximizing the speed of the wind in the duct by maximizing the degree of reduced pressure in the reduced pressure area at the rear of the duct.

Further, the wind power generation device according to the present invention is characterized in that the predetermined angle is 2° to 12°, and the protruding length of the pencil body from the rear of the duct is set to 0.1 to 0.4 times the duct length.

Here, the predetermined angle is defined as an angle of inclination in the positive direction such that the chord of the wing section is farther apart from the duct axis at a front edge than a rear edge.

The wind power generation device according to the present invention is characterized in that the blades of the impeller are provided within a range of 0.07 times the duct length in a forward direction, and 0.18 times the duct length in a rearward direction with respect to a minimum inner diameter portion of the duct.

BRIEF DESCRIPTION OF THE DRAWINGS

FIGS. 2 to 4 illustrate a function of the wind power generation device according to the embodiment;

BEST MODE FOR CARRYING OUT THE INVENTION

An embodiment of a wind power generation device according to the present invention will be described with reference to the drawings.

Figure 1:
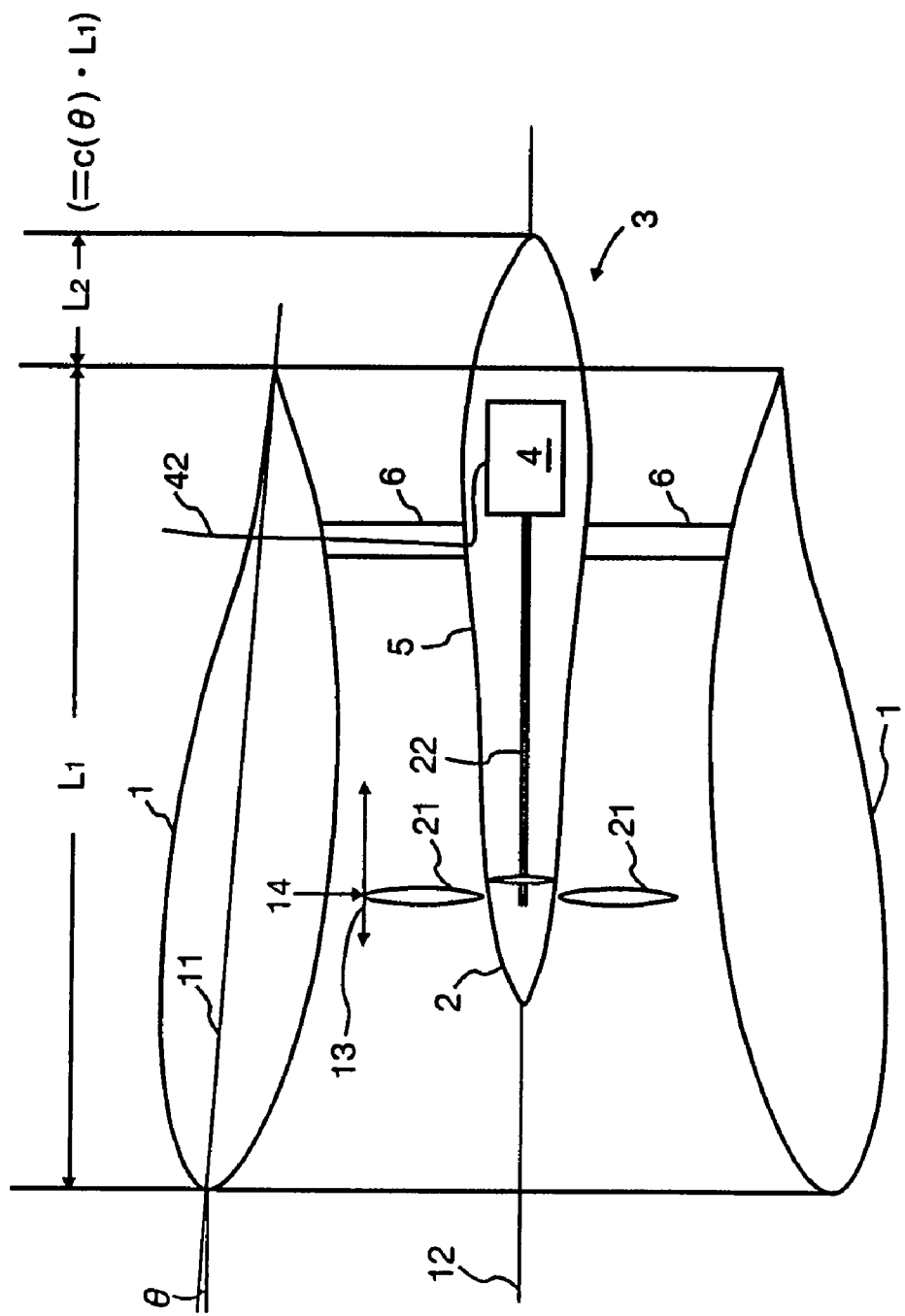
FIG. 1 is a side sectional view of a wind power generation device according to an embodiment.

The wind power generation device in FIG. 1 comprises: a substantially cylindrical duct 1; an impeller 2 having a plurality of blades 21 protruding outward and rotatable around a duct axis x; and a nacelle 5 that constitutes a streamlined pencil body 3 together with the impeller 2 and houses a generator 4 that uses torque of the impeller 2 transmitted via a rotational axis 22. The nacelle 5 is secured to the duct 1 by a post 6 protruding from an inner wall of the duct 1. Power generation energy from the generator 4 is supplied to the outside via a lead 42 passing through the post 6 and the duct 1.

The duct 1 has a side wall with a wing section. This is intended to produce a reduced pressure area at a rear of the duct 1 and prevent generation of swirl at the rear of the duct 1 as described later. As the wing section of the side wall of the duct 1, known shapes of airfoils: NACA653-618 (9-0.5), NACA633-618, FA66-S-196V1, or the like are used.

A chord 11 of the wing section of the side wall of the duct 1 is inclined at a predetermined angle θ to a duct axis 12. The predetermined angle θ is defined in the positive direction that is a direction of an increase in a ratio of a tip diameter of the duct 1 to a rear end diameter thereof.

More specifically, as shown in FIG. 1, the aforementioned predetermined angle θ is a positive angle such that a leading edge of the chord 11 at the front end of the duct 1 is separated a greater distance from the duct axis 12 than a trailing edge of the chord 11 at the rear end of the duct 1.

The pencil body 3 is provided so that a tip of the impeller 2 corresponding to a tip of the pencil body 3 is placed in the duct 1 and a rear end of the nacelle 5 corresponding to a rear end of the pencil body 3 protrudes from the rear end of the duct 1. A protruding length L2 of the rear end of the pencil body 3 from the duct 1 is set to c (>0) times a duct length L1. A coefficient c is expressed as a monotone decreasing function c (q) that satisfies the conditions: c (2°)=0.4, c (12°)=0.1 with the predetermined angle q as a variable. This is intended to bring the rear end of the pencil body 3 close to a tip of the reduced pressure area produced at the rear of the duct 1.

In the duct 1, the blades 21 of the impeller 2 are provided in a maximum wind speed area 13, that is, within a range of 0.07 times the duct length $L_1$ in a forward direction, and 0.18 times the duct length $L_1$ in a rearward direction with respect to a minimum inner diameter portion 14 of the duct 1.

A function of the wind power generation device having the above described configuration will be described with reference to FIGS. 2 to 4.

The inventor of the present application studied in simulation the flow and the speed of wind near the duct 1 when the wind from the front to the rear of the duct 1 is created.

This simulation was performed according to a method described in the paper "Unsteady Flow Simulation and Its Visualization" by K. Kuwahara (The American Institute of Aeronautics and Astronautics NACA-6405). According to this method, a virtual grid system is first formed in a space, and a Navier-Stokes equation (an equation that expresses momentum conservation law of continuum) at each grid point is presented. Then, into a space partial differential term of a Navier-Stokes equation at one grid point, effects of a fluid at other grid points near the above described point are factored, and then a partial differential equation for simulation is presented. Then, the partial differential equation is solved to determine the wind speed at each grid point.

In this simulation, the predetermined angle θ was set to 8.7°, the duct length $L_1$ to 5000 mm, the protruding length $L_2$ of the rear end of the pencil body 3 to 1000 mm (=0.20$L_1$), the minimum inner diameter of the duct 1 to 1800 mm, and the tip diameter to 3166 mm.

The simulation results revealed the following. Specifically, according to the wind power generation device, when the wind from the front to the rear of the duct 1 is created, a reduced pressure area 50 may be produced as diagonally shaded in FIG. 2. As seen from the flow of wind shown by solid lines in FIG. 3, generation of swirl is prevented at the rear of the duct 1. Thus, bringing wind into the duct by the reduced pressure area 50 can increase the wind speed in the duct 1 while eliminating the flow of wind from the front to the inside of the duct 1 being prevented by the swirl at the rear of the duct 1.

Figure 2:
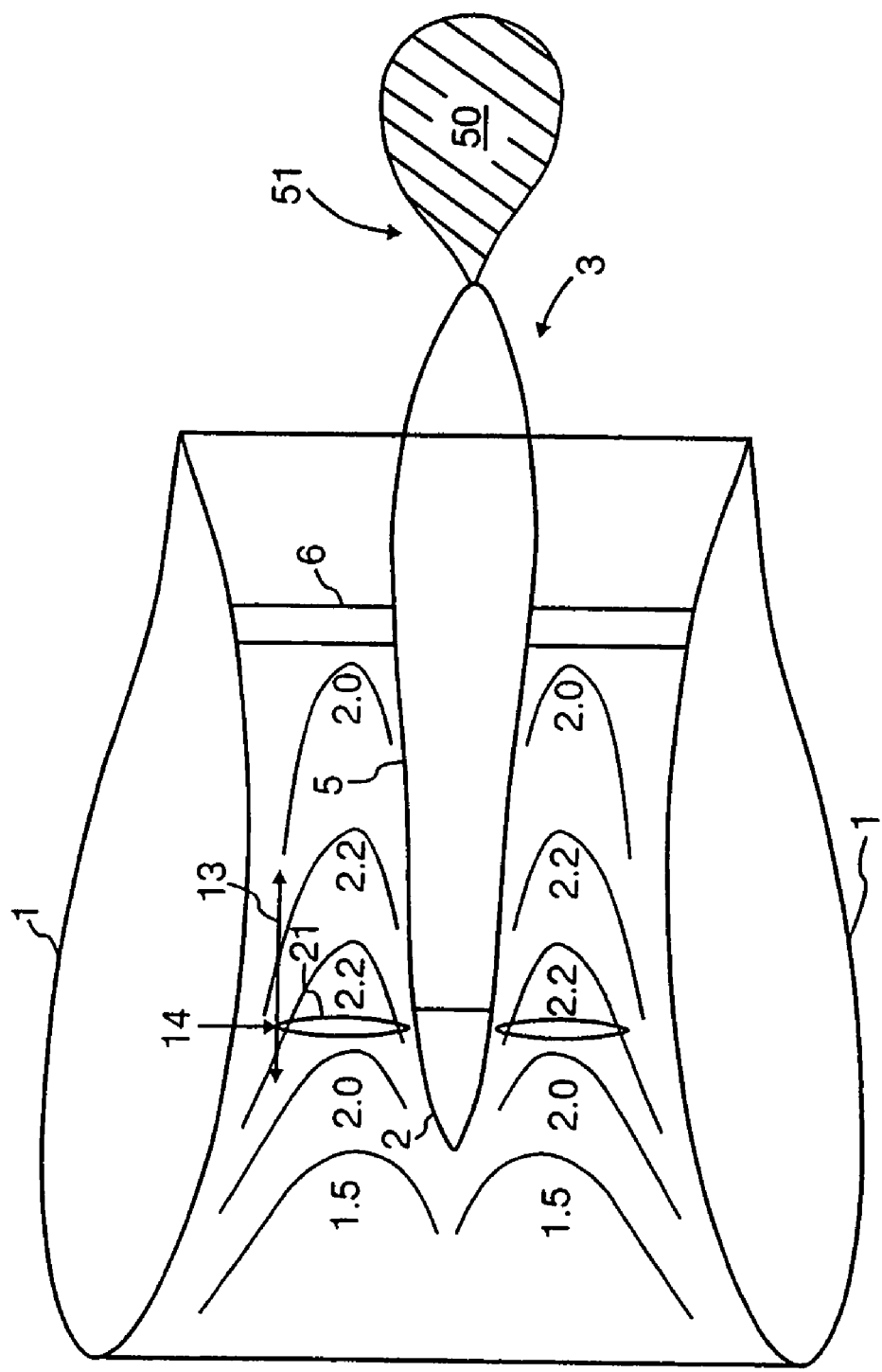

FIG. 2 shows isotachs in the duct 1 together with speed increases when the wind speed at the front of the duct 1 is 1.0. As seen from FIG. 2, the speed increase in the maximum wind speed area 13 of the duct 1 is 2.2, and specifically, the wind speed in the area 13 is 2.2 times the speed at the tip. Wind power energy is expressed as $\rho S v^3/2$ where v is a wind speed, ρ is fluid density, and S is a sectional area of the duct 1. In the embodiment, a sectional area of an opening of the duct 1 is about 3.1 times the sectional area of the minimum inner diameter position, and thus the wind power energy in the maximum wind speed area 13 of the duct 1 is increased to $2.2^3/3.1$ to 3.43 times the wind power energy at the front of the duct 1.

As shown in FIG. 2, the rear end of the pencil body 3 protrudes from the rear of the duct 1 and reaches a tip 51 of the reduced pressure area 50. Thus, the tip 51 of the reduced pressure area 50 is brought to the rear end of the pencil body 3 and becomes stable, and thus sway of the tip is prevented. This prevents the sway of the tip 51 of the reduced pressure area 50 causing the entire reduced pressure area 50 to disappear while the wind blows from the front to the rear of the duct 1. Then, the reduced pressure area 50 at the rear of the duct 1 can be maintained in a steady state to ensure the increase in the wind speed in the duct 1.

Further, the blades 21 of the impeller 2 are provided in the maximum wind speed area 13 in the duct 1, thereby allowing the impeller 2 to rotate to the maximum extent.

Therefore, according to the wind power generation device of the present invention, power generation efficiency can be improved through: (1) the increase in the wind speed in the duct 1 resulting from the production of the reduced pressure area 50 at the rear of the duct 1; (2) maintaining the steady state of the reduced pressure area 50 by preventing the sway of the tip 51 of the reduced pressure area 50; and (3) the rotation of the impeller 2 in the maximum wind speed area 13 in the duct 1.

FIG. 4 shows simulation results of speed increases in the maximum wind speed area 13 of the duct 1 when the predetermined angle θ is changed, and according to this, the protruding length $L_2$ (=c(θ)·L1) of the rear end of the pencil body 3 is changed. As seen from FIG. 4, when the predetermined angle θ is set to 2° to 12°, the speed increase of the wind in the duct 1 can be maximized (=2.2). Specifically, when the predetermined angle θ is set to 2° to 12°, the degree of reduced pressure of the reduced pressure area 50 at the rear of the duct 1 becomes maximum, and the wind flowing from the front to the inside of the duct 1 is further brought into the duct by the reduced pressure area 50 at the rear of the duct 1, thereby further increasing the wind speed in the duct 1.

Thus, the predetermined angle θ is set to 2° to 12°, and according to this, the protruding length $L_2$ of the rear end of the pencil body 3 is adjusted. Therefore, in addition to the above described items (1) to (3), power generation efficiency can be maximized through: (4) maximizing the speed of the wind in the duct by maximizing the degree of reduced pressure in the reduced pressure area at the rear of the duct.

The invention claimed is:

1. A wind power generation device comprising:

a substaiitially cylindrical duct;

an impeller having a plurality of blades protruding outward, said impeller being rotatable around a duct axis; and a nacelle that constitutes a streamlined pencil body together with said impeller and houses a generator that uses a torque of said impeller, wherein said duct has a side wall with a wing-shaped cross section, so as to be able to produce a reduced pressure area at a rear of said duct and prevent generation of swirl at the rear of said duct, wherein said pencil body is provided such that a forward end thereof is disposed inside of said duct and a rear end thereof protrudes outwardly from a rear end of said duct, so as to be close to a tip of the reduced pressure area produced at the rear of said duct, wherein blades of said impeller are provided in a maximum wind speed area in said duct, wherein a chord of said wing-shaped cross section of said side wall of said duct is inclined at a predetermined angle to the duct axis, and wherein a protruding length of the rear end of said pencil body from the rear of said duct is adjusted according to a position of the tip of said reduced pressure area, which changes depending on said predetermined angle, wherein said predetermined angle is a positive angle such that a leading edge of said chord at the front end of said duct is separated a greater distance from said duct axis than a trailing edge of said chord at the rear end of said, and wherein said predetermined angle is 2° to 12°, and the protruding length of said pencil body from the rear of said duct is 0.1 to 0.4 times a length of said duct.

2. The wind power generation device according to claim 1, wherein said blades of said impeller are provided within a range of 0.07 times the length of said duct in a forward direction, and 0.18 times the length of said duct in a rearward direction, with respect to a minimum inner diameter portion of said duct.

3. The wind power generation device according to claim 1, wherein said blades of said impeller are provided within a range of 0.07 times the length of said duct in a forward direction, and 0.18 times the length of said duct in a rearward direction with respect to a minimum inner diameter portion of said duct.

4. A wind power generation device comprising:

a substantially cylindrical duct;

an impeller having a plurality of blades protruding outward, said impeller being rotatable around a duct axis; and a nacelle that constitutes a streamlined pencil body together with said impeller and houses a generator that uses a torque of said impeller, wherein said duct has a side wall with a wing-shaped cross section, so as to be able to produce a reduced pressure area at a rear of said duct and prevent generation of swirl at the rear of said duct, wherein said pencil body is provided such that a forward end thereof is disposed inside of said duct and a rear end thereof protrudes outwardly from a rear end of said duct, so as to be close to a tip of the reduced pressure area produced at the rear of said duct, wherein blades of said impeller are provided in a maximum wind speed area in said duct, wherein said blades of said impeller are provided within a range of 0.07 times the length of said duct in a forward direction, and 0.18 times the length of said duct in a rearward direction, with respect to a minimum inner diameter portion of said duct, wherein a chord of said wing-shaped cross section of said side wall of said duct is inclined at a predetermined angle to the duct axis, and wherein a protruding length of the rear end of said pencil body from the rear of said duct is adjusted according to a position of the tip of said reduced pressure area, which changes depending on said predetermined angle, and wherein said predetermined angle is 2° to 12°, and the protruding length of said pencil body from the rear of said duct is 0.1 to 0.4 times a length of said duct.

5. The wind power generation device according to claim 4, wherein said predetermined angle is a positive angle such that a leading edge of said chord at the front end of said duct is separated a greater distance from said duct axis than a trailing edge of said chord at the rear end of said duct.

* * * * *